(12) United States Patent
    Robitaille

(10) Patent No.: US 8,511,870 B2
(45) Date of Patent: Aug. 20, 2013

(54) METHOD AND APPARATUS FOR GENERATING MONOCHROMATIC OR POLYCHROMATIC RADIATION

(75) Inventor: Blaise R. J. Robitaille, Barrie (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 462 days.

(21) Appl. No.: 12/823,725

(22) Filed: Jun. 25, 2010

(65) Prior Publication Data

US 2010/0328937 A1   Dec. 30, 2010

Related U.S. Application Data

(60) Provisional application No. 61/220,378, filed on Jun. 25, 2009.

(51) Int. Cl.
    *F21S 8/08* (2006.01)
(52) U.S. Cl.
    USPC .............................. 362/419; 362/285; 362/231
(58) Field of Classification Search
    USPC .......................................... 362/285, 231, 419
    See application file for complete search history.

(56) References Cited

U.S. PATENT DOCUMENTS 7,357,532 B2 *  4/2008  Lin et al. ........................ 362/285
7,473,007 B1 *  1/2009  Wang ............................. 362/187

\* cited by examiner

*Primary Examiner* — Diane Lee
*Assistant Examiner* — Sean Gramling
(74) *Attorney, Agent, or Firm* — Lando & Anastasi, LLP

(57) ABSTRACT

A method and apparatus involve a radiation source assembly that outputs radiation along an output path of travel, and that has a support section configured to facilitate support of the assembly so that a position of the assembly can be adjusted approximately pivotally about the output path of travel. According to a different aspect, a method and apparatus involve: generating radiation with a radiation source in a radiation source assembly that is a modular unit; emitting this radiation approximately in a direction; supporting the radiation source near an input port of a radiation guide so that the radiation from the radiation source enters the input port, and so that the radiation source is positionally adjustable toward and away from the input port parallel to the direction; and supplying radiation through the radiation guide from the input port to an output port thereof.

14 Claims, 12 Drawing Sheets

US 8,511,870 B2

METHOD AND APPARATUS FOR GENERATING MONOCHROMATIC OR POLYCHROMATIC RADIATION

This application claims the priority under 35 U.S.C. §119 of provisional application No. 61/220,378 filed Jun. 25, 2009, the entire disclosure of which is hereby incorporated herein by reference.

FIELD OF THE INVENTION

This invention relates in general to optical systems and, more particularly, to techniques for generating monochromatic or polychromatic radiation.

BACKGROUND

Due to advances in light emitting diode (LED) technology, LED's are becoming progressively more widely used in many fields. For example, there are image projection systems in which light from one or more LEDs is directed onto a digital micro-mirror device (DMD), and then routed to and displayed on a screen. Although existing LED source assemblies have been generally adequate for their intended purposes, they have not been entirely satisfactory in all respects. For example, existing LED source assemblies tend to be bulky rather than compact, do not permit easy and rapid interchange of monochromatic and polychromatic source assemblies, do not permit easy and rapid replacement of a failed LED, often require realignment after LED replacement, do not provide adequate adjustment to maximize coupling of LED light into other optics, and do not provide adequate rotational adjustment to align an output beam with other optics in order to achieve uniform brightness throughout a projected image. Further, existing LED source assemblies may not be entirely suitable for applications where daytime brightness and/or source lifetime are important.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
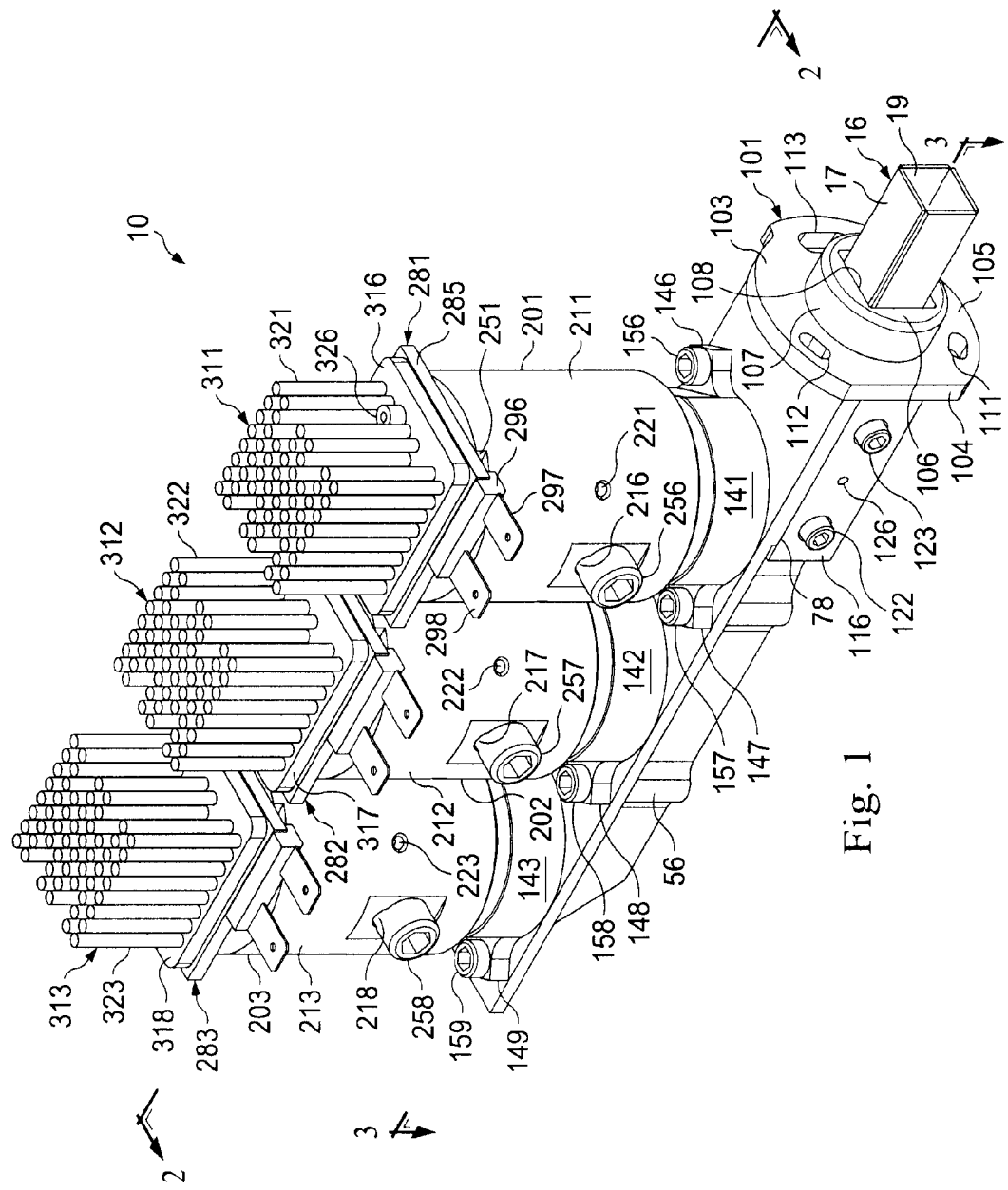
FIG. 1 is a diagrammatic perspective view of an apparatus that is a polychromatic light emitting diode (LED) light source assembly embodying aspects of the invention.
Figure 2:
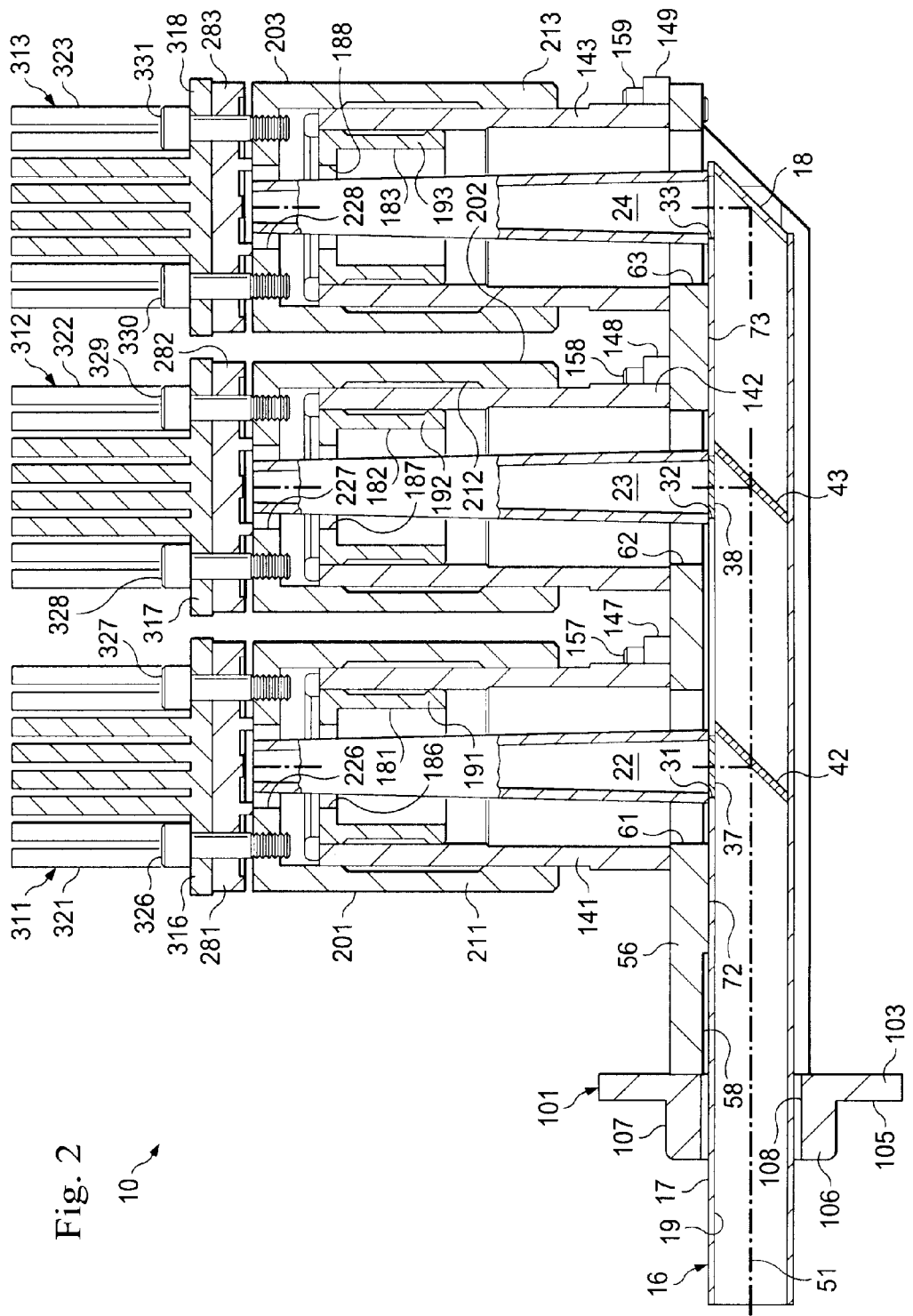
FIG. 2 is a diagrammatic sectional side view taken along line 2-2 in FIG. 1.
Figure 3:
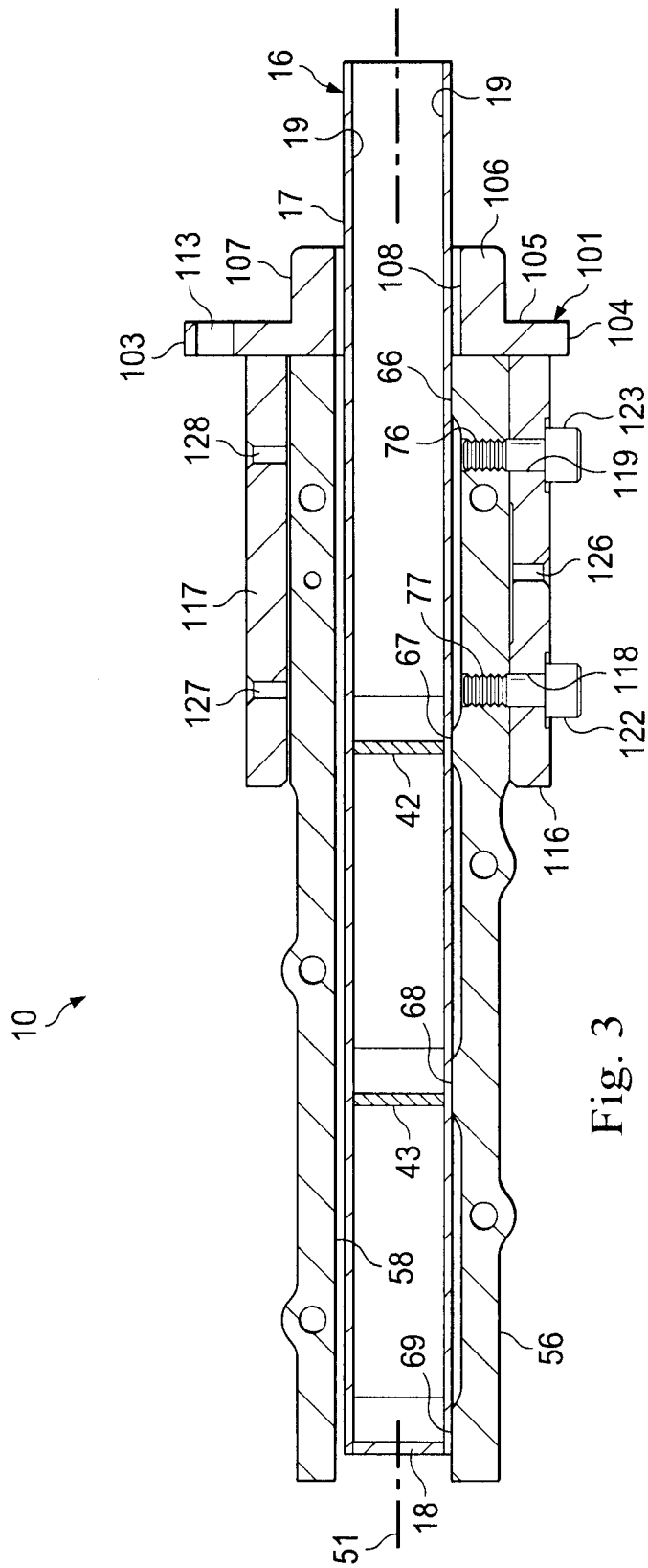
FIG. 3 is a diagrammatic sectional top view taken along line 3-3 in FIG. 1.
Figure 4:
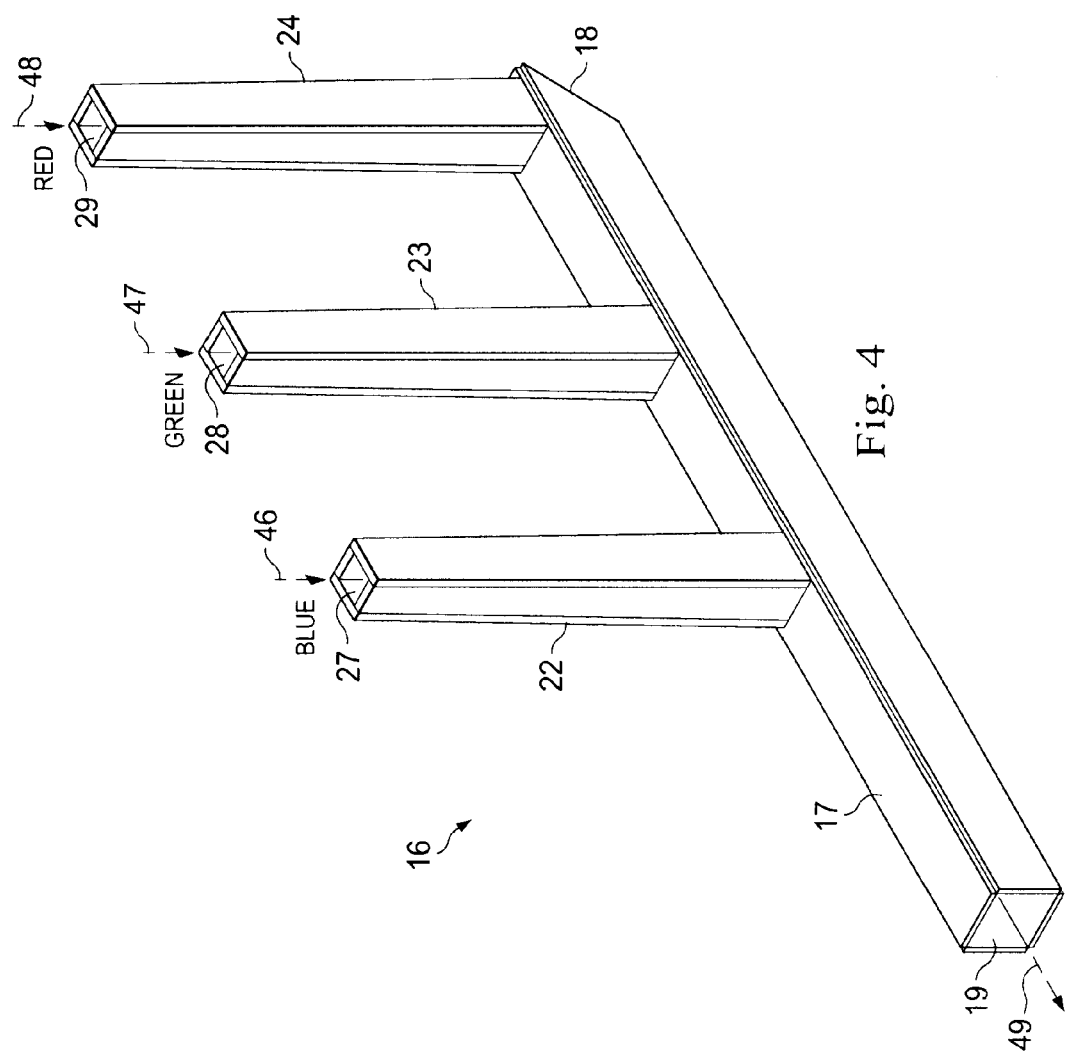
FIG. 4 is a diagrammatic perspective view of a light pipe that is a component of the assembly of FIG. 1.

FIG. 1 is a diagrammatic perspective view of an apparatus that is a polychromatic light emitting diode (LED) light source assembly 10 embodying aspects of the invention. FIG. 2 is a diagrammatic sectional side view taken along line 2-2 in FIG. 1. FIG. 3 is a diagrammatic sectional top view taken along line 3-3 in FIG. 1. FIG. 4 is a diagrammatic perspective view of a radiation guide or light pipe 16 that is a component of the assembly 10 of FIG. 1.

With reference to FIGS. 2 and 4, the light pipe 16 includes a horizontally-extending main tube 17 having four walls and a rectangular cross-sectional shape. The main tube 17 has a central opening with a rectangular cross-sectional shape. At one end of the main tube 17, the central opening serves as an outlet port 19 of the light pipe 16. The opposite end of the main tube 17 is closed by an inclined end wall 18. Three spaced, tubular chimneys 22, 23 and 24 each extend upwardly from a top wall of the main tube 17. The chimneys 22-24 each have four walls arranged to form the frustrum of a four-sided pyramid. Thus, the chimneys 22-24 each have a cross-sectional size that tapers progressively in an upward direction. The chimneys each have therein a vertical opening of rectangular cross-section that tapers in cross-sectional size in an upward direction. The upper ends of the chimneys 22, 23 and 24 serve as respective inlet ports 27, 28 and 29 for radiation, as explained in more detail later.

In the disclosed embodiment, the walls of the main tube 17 and each of the chimneys 22-24 are all made of a material that is commonly known as float glass. However, they could alternatively be made of any other suitable material. The inner side of each of these walls has a reflective coating of a known type that is not separately illustrated in the drawings, and that is highly reflective to all radiation within the visible spectrum. The various walls of float glass in the light pipe 16 are fixedly secured to each other by a suitable adhesive. In the disclosed embodiment, the adhesive is a two-part epoxy adhesive, and in particular is ECCOBOND® 45 SC mixed at a ratio of 1:1 with a catalyst that is ECOB #15 SC, both of which are available commercially from Emerson & Cuming of Billerica, Mass.

With reference to FIG. 2, the top wall of the main tube 17 has three spaced, rectangular openings 31, 32 and 33 extending vertically through it, where the openings 31-33 are each aligned with the lower end of a respective one of the chimneys 22, 23 and 24. The opening 33 has nothing in it. The openings 31 and 32 each have a respective dichroic mirror 37 or 38 adhesively secured therein. The dichroic mirror 37 is transmissive to blue light, but is reflective to light of other colors propagating within the main tube 17, including green and red light. The dichroic mirror 38 is transmissive to green light, but is reflective to light of other colors propagating within the main tube 17, including blue and red light.

Two further dichroic mirrors 42 and 43 are adhesively secured within the main tube 17 at spaced locations along a centerline 51 of the central opening through the main tube. The mirrors 42 and 43 each extend at an angle of 45° with respect to the centerline 51. The mirror 42 is located directly below opening 31, and the mirror 43 is located directly below opening 32. The dichroic mirror 42 is transmissive to green light and red light, and is reflective to blue light. The dichroic mirror 43 is transmissive to red light, and is reflective to green light. In the disclosed embodiment, the mirrors 31-32 and 42-43 are each fixedly secured in place with an optical adhesive that, in the disclosed embodiment, is available commercially under the tradename NORLAND 61 from Norland Products, Inc. of Cranbury, N.J. The NORLAND 61 adhesive cures when exposed to ultraviolet light. Alternatively, the mirrors 31-32 and 42-43 could be secured in place using any other suitable adhesive.

Blue radiation is generated in a manner discussed later, is divergent, propagates downwardly along a path of travel 46, and enters the inlet port 27. Green radiation is generated in a manner discussed later, is divergent, travels downwardly along a path of travel 47, and enters the inlet port 28. Red radiation is generated in a manner discussed later, is divergent, travels downwardly along a path of travel 48, and enters the inlet port 29.

With reference to FIG. 2, the red radiation traveling downwardly through chimney 24 passes through the opening 33, is reflected by the reflective coating on the end wall 18, and then travels horizontally through the main tube 17, where it passes successively through the dichroic mirrors 43 and 42, and then exits through the outlet port 19 along a path of travel 49 (FIG. 4). The path of travel 49 is coincident with the centerline 51. Green radiation traveling downwardly through chimney 23 passes through the dichroic mirror 38, is reflected by the dichroic mirror 43, and then travels horizontally through the main tube 17, where it passes through the dichroic mirror 42, and then exits through the outlet port 19 along the path of travel 49. Blue radiation traveling downwardly through chimney 22 passes through the dichroic mirror 37, is reflected by the dichoric mirror 42, and then travels horizontally through the main tube 17 and exits through the outlet port 19 along the path of travel 49.

As discussed above, all walls of the light tube 16 have a highly reflective coating on the inner side thereof. Thus, to the extent radiation traveling through any of the chimneys 22-24 or through the main tube 17 strikes any wall of the light tube, virtually all of that radiation will be reflected and continue traveling through the light pipe to the outlet port 19. The dichroic mirrors 37-38 and 42-43 also help to keep radiation within the main tube 17, and moving along the main tube 17 toward the outlet port 19. In addition, reflections from the walls and mirrors help to thoroughly mix or homogenize the blue light, green light and red light traveling to the outlet port 19 from the respective inlet ports 27-29.

Figure 5:
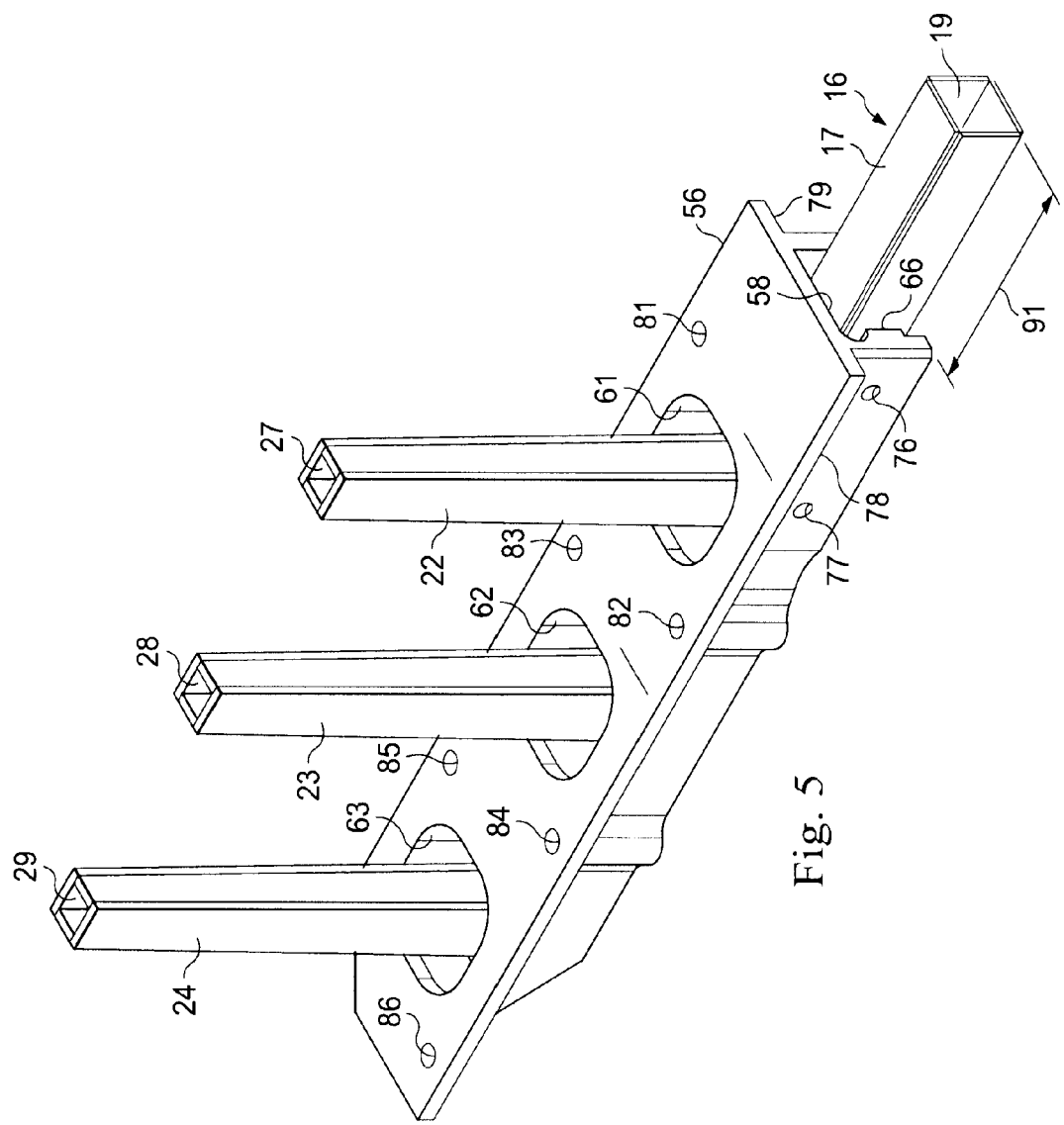
FIG. 5 is a diagrammatic perspective view showing the light pipe of FIG. 4, with a frame that is another component of the assembly of FIG. 1.

FIG. 5 is a diagrammatic perspective view showing the light pipe 16 of FIG. 4, with a frame 56 that is another component of the assembly 10 of FIG. 1. In the disclosed embodiment, the frame 56 is made of commercially-available aluminum alloy 6061-T6, but could alternatively be made of any other suitable material. As shown in FIG. 5, the frame 56 has in an underside thereof a channel or groove 58 that extends the entire length of the frame. The frame 56 thus has an approximately U-shaped cross-sectional shape, including a horizontal top wall and two parallel, spaced side walls that extend vertically downwardly from opposite side edges of the top wall. The frame 56 also has three spaced rectangular openings through the top wall thereof that each communicate with the channel 58.

With reference to FIG. 3, an inner side of one side wall of the frame has four spaced, coplanar reference surfaces 66, 67, 68 and 69. With reference to FIG. 2, an underside of the top wall has two spaced, coplanar reference surfaces 72 and 73. Referring again to FIG. 5, the side wall with reference surfaces 66-69 also has two threaded openings 76 and 77 that are near one end, that are horizontally spaced, and that extend horizontally into this side wall from the outer side thereof. Above the openings 76 and 77, there is a downwardly facing edge surface 78. A similar edge surface 79 is provided on the opposite side of the frame 56. With reference to FIG. 5, the frame 56 has six threaded openings 81, 82, 83, 84, 85 and 86 that extend vertically downwardly into the top wall. The openings 81 and 82 are disposed on opposite sides of the opening 61, the openings 83 and 84 are disposed on opposite sides of the opening 62, and the openings 85 and 86 are disposed on opposite sides of the opening 63.

With reference to FIGS. 2, 3 and 5, the main tube 17 of the light pipe 16 is received within the channel 58 of the frame 56, except that the end with outlet port 19 projects outwardly beyond one end of the frame 56. The chimneys 22-24 each extend upwardly through a respective one of the openings 61-63. The openings 61-63 are larger in size than the lower ends of the chimneys, such that the edges of the openings 61-63 do not contact the chimneys. As shown in FIG. 3, one side wall of the main tube 17 engages the four reference surfaces 66-69 on the frame, in order to align the main tube with the frame in one horizontal direction. As shown in FIG. 2, the top wall of the main tube 17 engages the two reference surfaces 72 and 73 on the frame, in order to align the main tube with the frame in a vertical direction. This cooperation between the main tube 17 and the reference surfaces 66-69 and 72-73 ensures that that centerline 51 of the main tube 17 is very accurately positioned at a particular location in relation to the frame 56. With reference to FIG. 5, a not-illustrated assembly jig is used to accurately position the frame with respect to the light pipe 16 in another horizontal direction, so that the main tube 17 extends outwardly a specific distance 91 beyond an end of the frame 56. A quantity of the above-mentioned ECCOBOND® epoxy adhesive is then injected into gaps between outer surfaces of the main tube 17 and inner surfaces of the channel 58 in the frame 56, and then is allowed to harden, in order to fixedly secure the light pipe 16 in place with respect to the frame 56, with very accurate alignment therebetween.

FIGS. 1, 2 and 3 show a mounting part 101. In the disclosed embodiment, the mounting part 101 is made of commercially-available aluminum alloy 6061-T6, but could alternatively be made of any other suitable material. The mounting part 101 includes an approximately circular plate or disk 103 having a flat 104 on one side thereof. The disk 103 can also be considered to be an annular flange. One side of the disk is disposed adjacent an end surface of the frame 56. On the opposite side of the disk, an annular planar surface 105 faces axially away from the frame 56. A cylindrical projection 106 extends outwardly beyond the surface 105 from the center of the disk in a direction away from the frame 56. The cylindrical projection 106 is approximately concentric with and of smaller diameter than the disk 103. The projection 106 has a radially-outwardly facing annular cylindrical surface 107 thereon.

The mounting part 101 has a rectangular opening 108 that extends axially through the disk 103 and the projection 106, and the main tube 17 of the light pipe 16 extends through this opening 108. The dimensions of the opening 108 are somewhat larger than the dimensions of the main tube 17, so that the edges of the opening 108 do not contact the main tube. The disk 103 has three arcuate slots 111, 112 and 113 that open axially therethrough, that each extend approximately circumferentially, and that are angularly spaced with respect to each other.

Two spaced, parallel legs 116 and 117 project axially from the side of disk 103 opposite the projection 106, and are disposed on opposite sides of the frame 56. The top edges of the legs 116 and 117 respectively engage the downwardly-facing edge surfaces 78 and 79 on the frame, in order to accurately position the mounting part 101 in two dimensions with respect to the frame 56 and the main tube 17 of the light pipe. The leg 116 has two openings 118 and 119 that are horizontally spaced, that extend horizontally through the leg, and that are respectively aligned with the openings 77 and 76 in the side wall of the frame 56. Two screws 122 and 123 have threaded shanks that respectively extend through the openings 118 and 119, and engage the threaded openings 77 and 76. The openings 118 and 119 have diameters larger than the diameters of the screw shanks, thereby permitting the legs 116 and 117 to move transversely with respect to the screws 122 and 123. As a result, the legs are positioned through the engagement of their top edges with the edge surfaces 78 and 79 on the frame 56, and not by engagement of the screws with edges of the openings 76 and 77. The screws 122 and 123 urge an inner surface of the leg 116 against a surface on the outer side of frame 56, which also helps to accurately position the mounting part 101 in a third dimension with respect to the frame 56. In the disclosed embodiment, the screws 122 and 123 are each made of stainless steel, but they could alternatively be made of any other suitable material. The cylindrical surface 107, the approximately circular disk 103 and the arcuate slots 111-113 are all substantially concentric to the centerline 51 of the main tube 17.

The leg 116 has a small opening 126 that extends horizontally therethrough between the screws 122 and 123, and the leg 117 has two horizontally-spaced openings 127 and 128 that extend horizontally therethrough. After the mounting part 101 has been secured to the frame 56 with the screws 122 and 123, a quantity of an adhesive is injected through the openings 126, 127 and 128 in order to fill gaps between the inner surfaces of legs 116-117 and the outer surfaces of frame 56, and then is allowed to harden to help fixedly secure the mounting part to the frame. In the disclosed embodiment, the adhesive is the above-mentioned ECCOBOND® epoxy adhesive, but could alternatively be any other suitable adhesive.

Figure 6:
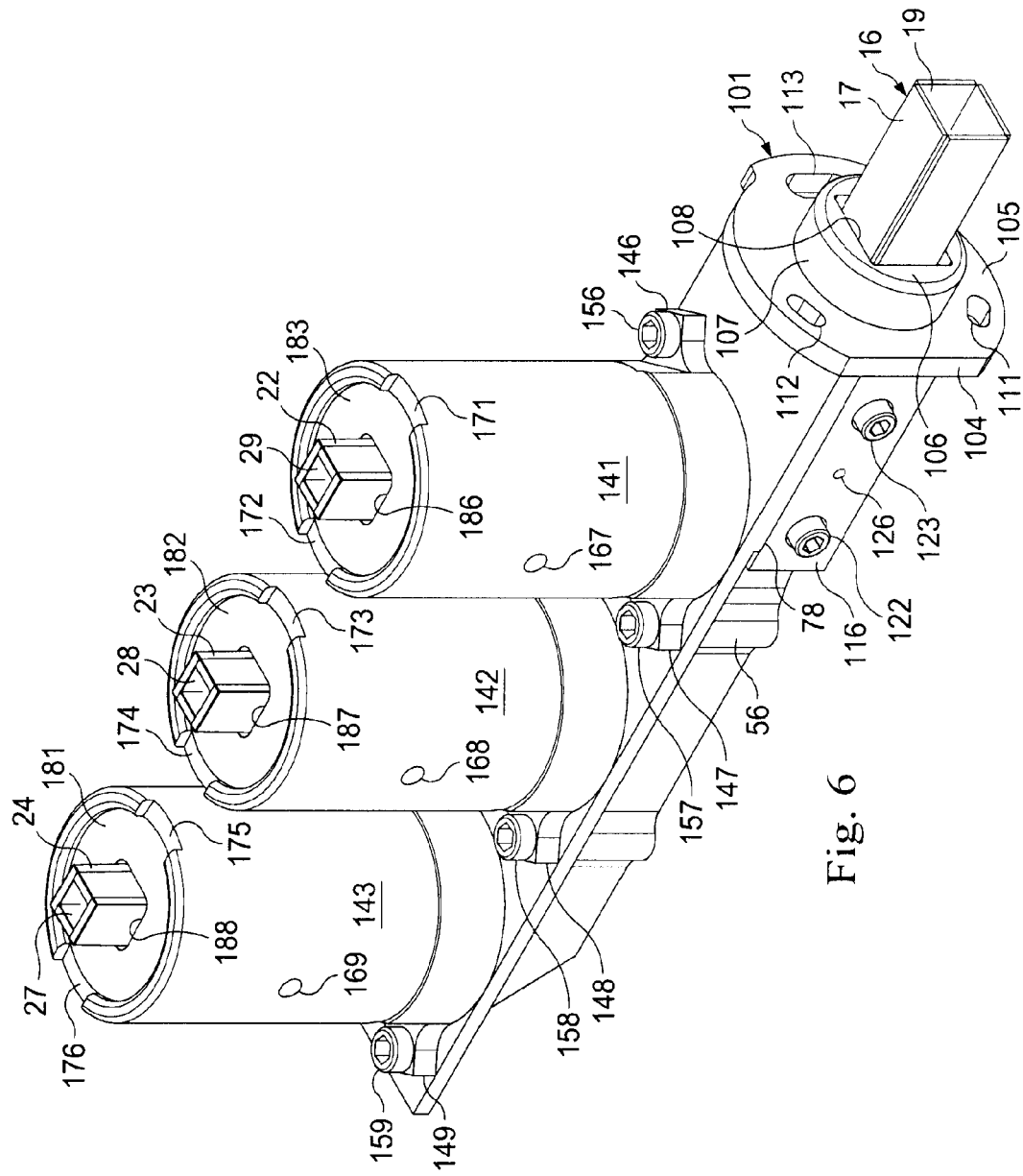
FIG. 6 is a diagrammatic perspective view of a portion of the assembly of FIG. 1 that is similar to FIG. 5, but that also includes some additional components.

FIG. 6 is a diagrammatic perspective view of a portion of the assembly 10 of FIG. 1 that is similar to FIG. 5, but that also includes some additional components. With reference to FIGS. 2 and 6, the assembly 10 includes three cylindrical collector tubes 141, 142 and 143. In the disclosed embodiment, the collector tubes 141-143 are each made of commercially-available aluminum alloy 6061-T6, but they could alternatively be made of any other suitable material. The collector tubes 141-143 each have a lower end that engages the top surface of the frame 56, and each have two tabs that project radially outwardly from the lower end on opposite sides thereof, four of these six tabs being visible in the drawings at 146-149. The six tabs each have a hole that extends vertically therethrough, but that is not visible in the drawings. The holes in the tabs are each aligned with a respective one of the six holes 81-86 (FIG. 5) in the frame 56.

The collector tubes 141-143 are held in place by six screws, four of which are visible in the drawings at 156-159. In the disclosed embodiment, the six screws 156-159 are all made of stainless steel, but they could alternatively be made of any other suitable material. The six screws 156-159 each have a threaded shank that extends vertically downwardly through the hole in a respective one of the six tabs 146-149, and threadedly engages a respective one of the six holes 81-86 (FIG. 5) in the frame 56. The holes in the six tabs have diameters that are somewhat larger than the diameters of the threaded shanks of the screws, thereby allowing a limited amount of movement of the collector tubes 141-143 in horizontal directions with respect to the frame 56 when the six screws 156-159 are in place but not yet fully tightened. This allows independent positioning of the collector tubes with respect to each other and with respect to the input ports 27-29 of the chimneys 22-24. The two screws for each collector tube can be tightened in order to fixedly secure that collector tube in a selected position with respect to the frame.

Each of the collector tubes 141, 142 and 143 has a respective threaded hole 167, 168 or 169 that extends horizontally into a side wall thereof. These holes are located approximately halfway between the upper and lower ends of the collector tubes 141-143. The collector tube 141 has, on diametrically opposites sides thereof, two recesses 171 and 172 that extend downwardly into the tube wall from an upper end thereof. The collector tubes 142 and 143 have similar recesses at 173, 174, 175 and 176.

Fixedly secured within the upper end of each collector tube 141, 142 and 143 is a respective cup-shaped support part 181, 182 or 183. In the disclosed embodiment, the support parts 181-183 are each made of commercially-available aluminum alloy 6061-T6, but could alternatively be made of any other suitable material. Each of the support parts 181-183 has a circular top wall with a respective rectangular opening 186-188 extending vertically through the center thereof. The circular top walls of the support parts 181-183 each have a top surface that is approximately flush with the bottom surfaces of the two adjacent recesses 171-172, 173-174 or 175-176. Each of the support parts 181-183 also has a respective annular flange 191-193 that extends downwardly from a peripheral edge of the circular top wall.

Each annular flange 191-193 has a cylindrical exterior surface that snugly engages a cylindrical inner surface of the associated collector tube 141-143. As can be seen in FIG. 2, the cylindrical exterior surfaces of the flanges 191-193 each have a shallow circumferential recess therein. An adhesive is injected into each of these circumferential recesses using not-illustrated holes through the walls of the collector tubes 141-143, in order to fixedly bond the support parts 181-183 to the collector tubes 141-143, respectively. In the disclosed embodiment, the adhesive is the above-mentioned ECCOBOND® epoxy adhesive, but could alternatively be any other suitable adhesive.

The chimneys 22-24 of the light pipe 16 have upper ends that each extend upwardly through a respective opening 186-188 in a respective support part 181-183. The openings 186-188 have a size larger than the portions of the chimneys disposed therein, so that the edges of the openings do not engage the chimneys. In this regard, with each of the six screws 156-159 slightly loosened, a not-illustrated assembly jig is used to position the collector tubes 141-143 relative to the frame 56 and the light pipe 16, so that the chimneys 22-24 are each accurately positioned within the associated collector tube 141-143. The six screws 156-159 are then each tightened in order to fixedly secure the collector tubes in position with respect to the frame. An adhesive is then applied in the gap between each of the chimneys 22-24 and the edges of the corresponding opening 186-188, in order to help support each of the chimneys 22-24 in the proper position relative to the corresponding collector tube 141-143. In the disclosed embodiment, the adhesive is the above-mentioned ECCOBOND® epoxy adhesive, but could alternatively be any other suitable adhesive.

Figure 7:
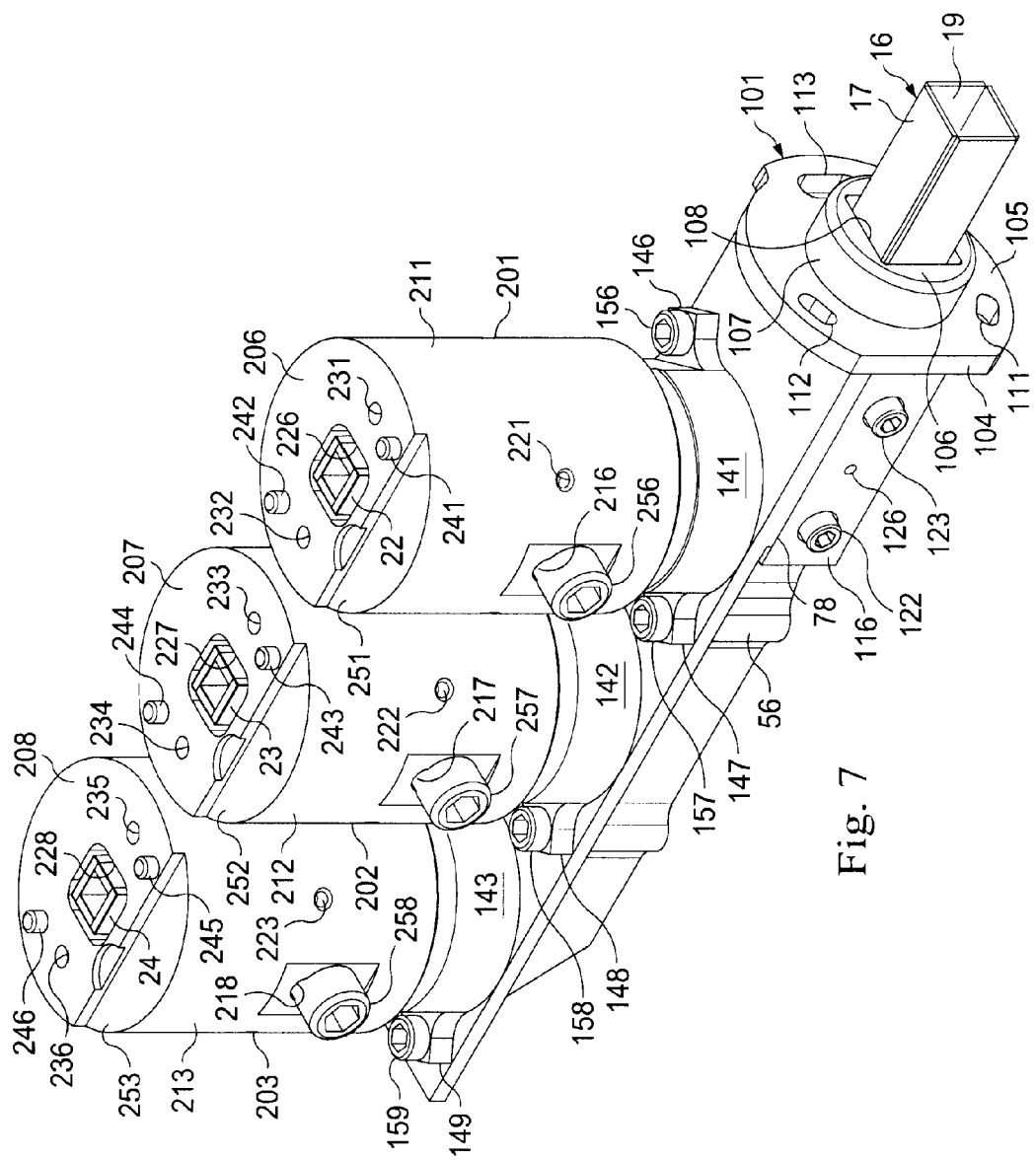
FIG. 7 is a diagrammatic perspective view of a portion of the assembly of FIG. 1 that is similar to FIG. 6, but that also includes some additional components.

FIG. 7 is a diagrammatic perspective view of a portion of the assembly 10 of FIG. 1 that is similar to FIG. 6, but that also includes some additional components. With reference to FIGS. 2 and 7, the assembly 10 includes three cup-shaped adjust tubes 201, 202 and 203. In the disclosed embodiment, the adjust tubes 201-203 are each made of commercially-available aluminum alloy 6061-T6, but could alternatively be made of any other suitable material. The adjust tubes 201-203 each have a respective circular top wall 206, 207 or 208, and a respective cylindrical flange 211, 212 or 213 that extends downwardly from the peripheral edges of the top wall. The adjust tubes 201-203 are respectively placed over the collector tubes 141-143. The flanges 211-213 of the adjust tubes 201-203 each have a cylindrical inner surface that slidably engages a cylindrical outer surface on the associated collector tube 141-143, in order to permit vertical sliding movement of each adjust tube 201-203 in relation to the associated collector tube 141-143.

The cylindrical flanges 211-213 of the adjust tubes 201-203 have respective slots 216-218 that extend vertically, and that open horizontally through the flanges. In addition, the flanges 211-213 each have four holes extending horizontally therethrough at circumferentially spaced locations, but only three of these holes are visible in the drawings at 221-223. These holes each communicate at the inner end with a shallow circumferential recess provided in the cylindrical inner surface of the associated flange 211-213. The top walls 206-208 of the adjust tubes 201-203 each have extending vertically therethrough a respective opening 226-228 of approximately rectangular shape. These openings 226-228 receive the upper ends of the respective chimneys 221-224 of the light pipe 16, and are sufficiently large so that the edges of the openings do not contact the chimneys.

The top wall 206 of the adjust tube 201 has two threaded openings 231 and 232 that extend vertically downwardly into it, on diametrically opposite sides of the rectangular opening 226. The top wall 207 of the adjust tube 202 has two similar threaded holes 233 and 234, and the top wall 208 of the adjust tube 203 has two similar threaded holes 235 and 236. Two cylindrical locating pins 241 and 242 have lower ends that are snugly received with a friction fit in respective cylindrical holes provided in the top of the adjust tube 201, and have upper ends that project upwardly beyond the planar top surface of the top wall 206 of the adjust tube 201. The adjust tube 202 has two similar locating pins 243 and 244, and the adjust tube 203 has two similar locating pins 245 and 246. In the disclosed embodiment, the locating pins 241-246 are each made of stainless steel, but they could alternatively be made of any other suitable material.

A shallow recess 251 is provided in the top wall 206 of the adjust tube 201, on one side thereof. Similar recesses 252 and 253 are respectively provided in the top walls 207 and 208 of the adjust tubes 202 and 203. Three screws 256-258 each have a threaded shank that extends through a respective one of the vertical slots 216-218, and threadedly engages a respective one of the threaded holes 167-169 (FIG. 6) in the collector tubes 141-143. In the disclosed embodiment, the screws 256-258 are each made of stainless steel, but they could alternatively be made of any other suitable material. When the screws 256-258 are not fully tightened, each of the adjust tubes 201-203 can move vertically with respect to the associated collector tube 141-143. When the adjust tubes 201-203 are in a suitable vertical position, the screws 256-258 can be tightened to releasably secure the adjust tubes against vertical movement with respect to the collector tubes 141-143. An adhesive can be injected through the twelve openings 221-223 and into the circumferential recesses in the flanges 211-213, and then allowed to harden, in order to help fixedly secure the adjust tubes 201-203 against vertical movement with respect to the collector tubes 141-143. In the disclosed embodiment, the adhesive is the above-mentioned ECCO-BOND® epoxy adhesive, but could alternatively be any other suitable adhesive.

With reference to FIGS. 1 and 2, three LED modules 281-283 are each supported on top of a respective one of the adjust tubes 201-203. The LED module 281 generates blue light and emits it downwardly into the chimney 22, the LED module 282 generates green light and emits it downwardly into the chimney 23, and the LED module 283 generates red light and emits it downwardly into the chimney 24. In the disclosed embodiment, the LED modules 281-283 are parts that are each obtained commercially under the tradename PHLATLIGHT® as part number PT 85 from Luminus Devices, Inc. of Billerica, Mass. Aside from the fact that they produce different colors, the LED modules 281-283 are effectively identical, and therefore only the LED module 281 will be described in greater detail below.

Figure 8:
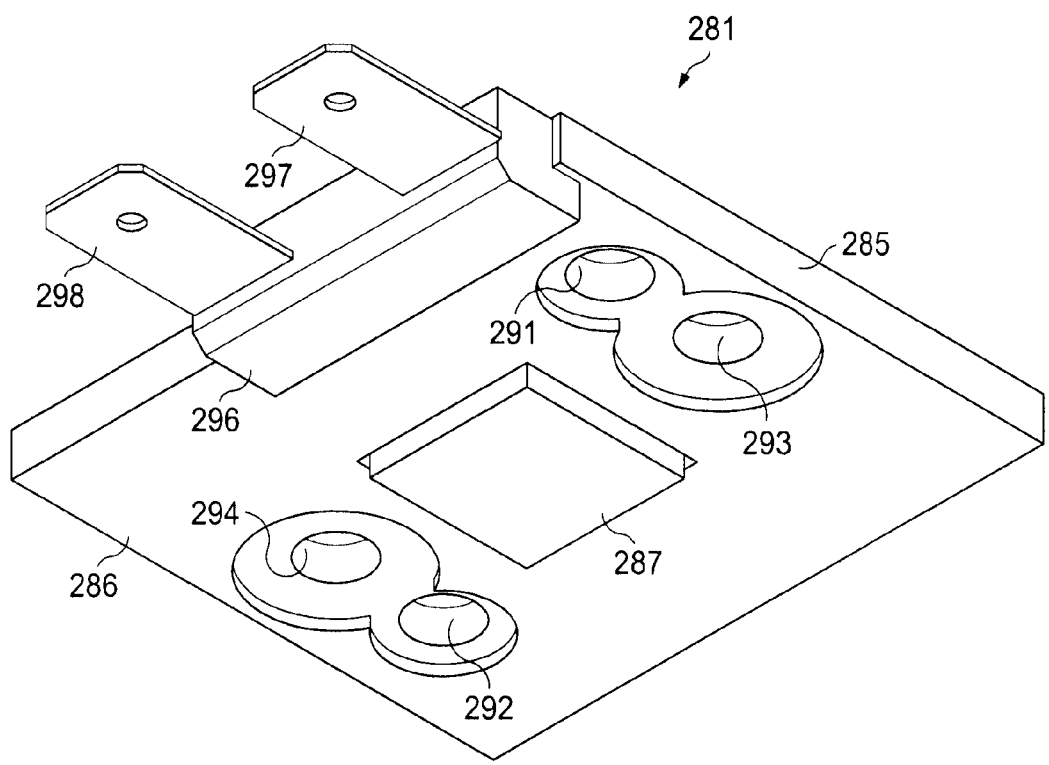
FIG. 8 is a diagrammatic perspective bottom view of an LED module that is a further component of the assembly of FIG. 1.

FIG. 8 is a diagrammatic perspective bottom view of the LED module 281. The LED module 281 has a plate-like body 285 with a generally planar bottom surface 286. The bottom surface has a rectangular opening with a rectangular transmissive window 287 mounted therein. The window 287 projects downwardly a small distance past the bottom surface 286, and has horizontal dimensions that are larger than the horizontal dimensions of the rectangular opening 226 through the top of the adjust tube 201. The LED structure that emits radiation is located just above the window 287, and the radiation is emitted downwardly through the window 287. Two spaced cylindrical holes 291 and 292 are disposed on opposite sides of the window 287, and extend upwardly into the body 285. Two more cylindrical holes 293 and 294 are disposed on opposite sides of the window 287, and extend vertically through the body 285. A block 296 of an electrical insulating material is mounted to an edge portion of the body 285. The block 296 is vertically thicker than the body 285, and extends downwardly beyond the bottom surface 286 of the body 285. Two spaced electrical contacts 297 and 298 project horizontally outwardly from the block 296. An electrical voltage can be applied between the contacts 297 and 298 through not-illustrated wires, thereby supplying the LED module 281 with electricity that causes it to emit radiation through the window 287.

With reference to FIGS. 7 and 8, the LED module 281 rests on top of the adjust tube 201, with the bottom surface of the module's window 287 engaging the top surface of the adjust tube 201, and with the two locating pins 241 and 242 being snugly slidably received within the respective holes 291 and 292. The cooperation between the pins 241-242 and the holes 291-292 serves to accurately align the LED module 281 in horizontal directions with respect to the adjust tube 201, so that the LED structure behind window 287 is aligned with the inlet port 27 at the top of chimney 22. The recess 251 in the adjust tube 201 receives part of the lower portion of the block 296. The holes 293 and 294 are aligned with the threaded holes 231 and 232 in the adjust tube 201. The LED modules 282 and 283 are respectively supported on the adjust tubes 202 and 203 in a similar manner.

Three heat sinks 311, 312 and 313 are respectively supported on top of the LED modules 281, 282 and 283. In the disclosed embodiment, the heat sinks 311-313 are each made of copper, but could alternatively be made of any other suitable material. The heat sinks serve to receive and dissipate heat emitted by the LED modules. The heat sinks 311, 312 and 313 include respective heat-conducting plates 316, 317 and 318 that each have a bottom surface engaging the top surface of a respective one of the LED modules 281, 282 and 283. To enhance heat transfer from the LED modules to the horizontal plates, a thermally-conducting material is provided between the LED modules 281-283 and the corresponding plates 316-318. In the disclosed embodiment, this material is a thermal joint compound available commercially under catalog number 120-2 from Wakefield Solutions, Inc. of Pelham, N.H. Alternatively, however, it would be possible to use any other suitable thermally-conductive material.

The heat sink 311 also includes a plurality of parallel and thermally-conductive spines 321 that are fixedly secured at their lower ends to and extend vertically upwardly from the horizontal plate 316. The heat sinks 312 and 313 each include a plurality of similar spines 322 and 323, respectively. With reference to FIG. 2, two screws 326 and 327 extend through spaced vertical holes in the plate 316 of the heat sink 311, through the holes 293 and 294 (FIG. 8) in the LED module 281, and threadedly engage the holes 231 and 232 (FIG. 7) in the adjust tube 201. The screws 326 and 327 fixedly couple the LED module 281 and the heat sink 311 to the adjust tube 201. In a similar manner, two screws 328 and 329 fixedly couple the heat sink 312 and the LED module 282 to the adjust tube 202, and two screws 330 and 331 fixedly couple the heat sink 313 and the LED module 283 to the adjust tube 203. In the disclosed embodiment, the screws 326-331 are each made of stainless steel, but they could alternatively be made of any other suitable material.

In the assembled state of the assembly 10, and as shown in FIGS. 2 and 8, the windows 287 of the LED modules 281, 282 and 283 are each disposed a small distance above the upper end of the corresponding chimney 22, 23 or 24 of the light pipe 16. The downward beams of radiation emitted by the LED modules 281-283 are diverging beams, where the diverging rays are spread over an angle of divergence that can be as high as about 160°. In order to maximize the efficiency with which the emitted light is coupled into the inlet ports at the upper ends of the chimneys 22-24, the assembly 10 provides the capability to independently adjust the position of each of the LED modules 281-283 in multiple dimensions relative to the inlet port at the upper end of a respective one of the chimneys 22-24.

Assume for the sake of discussion that there is a three-axis reference system having orthogonal X, Y and Z axes, where the X axis extends parallel to the horizontal centerline 51 of the main tube 17, and the Z axis extends vertically. The screw 256 can be loosened slightly, and then the adjust tube 201 can be moved vertically, or in other words parallel to the Z axis. This allows the LED in module 281 to be moved closer to or further from the inlet port at the upper end of the chimney 22, in order to maximize the amount of emitted light that is coupled into the chimney. The screw 256 can then be tightened when the adjust tube 201 is in a position that optimizes this coupling. Similarly, the screws 156 and 157 can each be loosened slightly, and the oversize holes in the tabs 146 and 147 permit movement of the collector tube 141, adjust tube 201 and LED module 281 in horizontal directions corresponding to both the X and Y axes, in order to ensure that the light emitted by LED module 281 is centered over the inlet port 27 at the top of the chimney 22. In a similar manner, the LED modules 282 and 283 can each be adjusted in three different dimensions. In this manner, the LED modules 281, 282 and 283 can each be adjusted entirely independently in three dimensions relative to each other and relative to the frame 56.

Assume for the sake of discussion that the LED module 281 eventually fails, and needs to be replaced. The two screws 326 and 327 (FIG. 2) can be removed, the heat sink 311 and LED module 281 can then be removed, and an identical replacement LED module can be installed on top of the adjust tube 201. The top surface of the adjust tube 201 and the two locating pins 241 and 242 will very accurately position the replacement LED module with respect to the inlet port 27 at the upper end of the chimney 22. A quantity of the previously-discussed thermal joint compound can then be applied to the top surface of the replacement LED module, the heat sink 311 can be put in position, and the two screws 326 and 327 can be reinstalled in order to fixedly secure the heat sink 311 and replacement LED module to the adjust tube 201. In this manner, any of the LED modules 281-283 can be quickly and easily replaced, and will automatically be accurately positioned with respect to the light pipe 16 so as to provide optimum coupling efficiency for emitted radiation, typically without need for any re-alignment. In the unlikely event that the coupling efficiency of a replaced module is not optimum, the position of that module relative to the associated chimney can be easily adjusted in one or both of the X and Y directions, by simply loosening two screws, by making an adjustment and by then tightening the screws.

Figure 9:
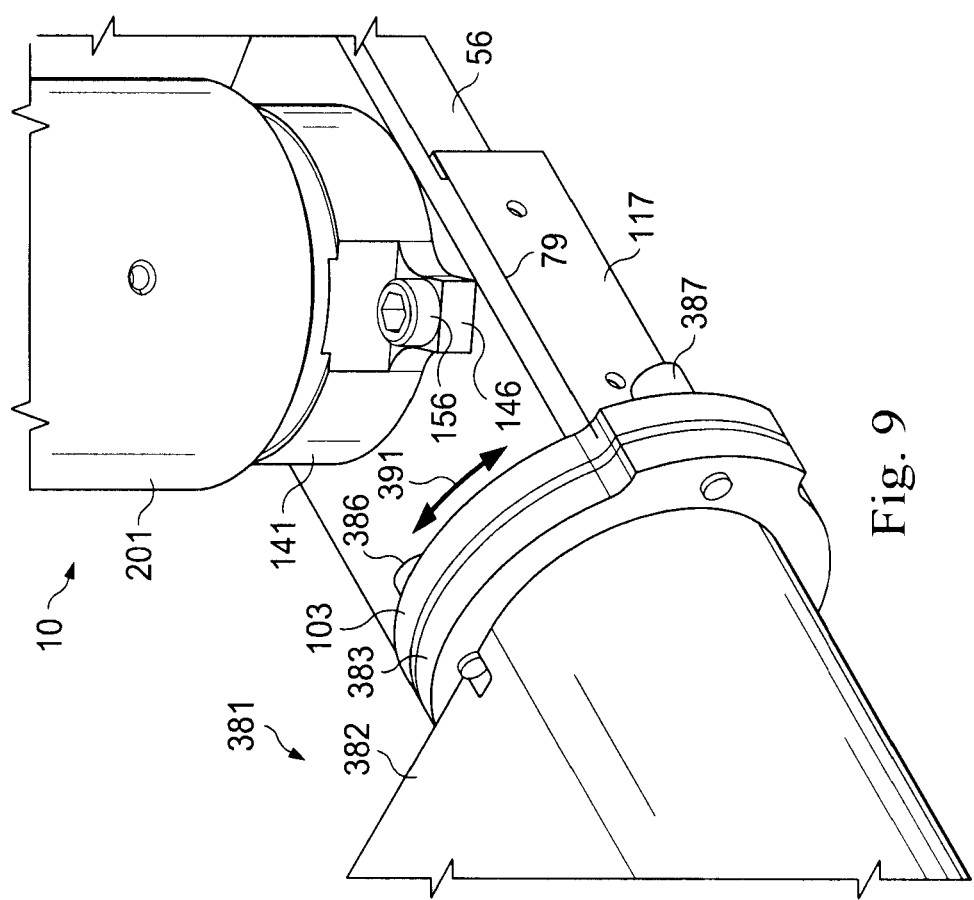
FIG. 9 is a diagrammatic fragmentary perspective view showing a projector, with the assembly of FIG. 1 installed thereon.

FIG. 9 is a diagrammatic fragmentary perspective view of a projector 381 having the assembly 10 of FIG. 1 installed thereon. The projector 381 is merely one example of a variety of different devices with which the assembly 10 can be used. The projector 381 includes a housing 382 with a circular disk 383 fixedly secured thereon. The circular disk 383 can also be considered to be an annular flange. The circular disk 103 of the assembly 10 is disposed against the circular disk 383 of the projector 381, with the annular surface 105 slidably engaging a complementary annular surface provided on the housing of the projector 381. The circular disk 383 has a not-illustrated circular opening in the center thereof, with a radially-inwardly facing annular cylindrical surface that is only slightly larger in diameter than and slidably engages the radially-outwardly facing annular cylindrical surface 107 on the mounting part 101. The sliding engagement of the two surfaces 105 and 107 on the assembly 382 with the two complementary surfaces on the housing 382 serves to accurately position the light source assembly 10 in relation to the housing. In particular, this sliding engagement ensures that that centerline 51 of the main tube 17 is very accurately positioned at a particular location in relation to the housing 382 of the projector 381. Three screws, two of which are visible in the drawings at 386 and 387, each extend through a respective one of the slots 111, 112 and 113 (FIG. 1) in the circular disk 103, and engage a respective threaded hole that is provided in the circular disk 383. In the disclosed embodiment, the three screws 386-387 are each made of stainless steel, but could alternatively be made of any other suitable material.

The projector 381 has therein a not-illustrated digital micro-mirror device (DMD) of a known type, which includes a rectangular array of micro-mirrors. Light exiting the outlet port 19 (FIG. 1) of the LED light source assembly 10 is a beam of approximately rectangular cross-sectional shape, and it is desirable that this rectangular beam be accurately aligned with the rectangular array of micro-mirrors, in order to provide uniform brightness across images produced by reflections from the micro-mirrors. To achieve this, the three screws 386-387 can be loosened slightly, and then the entire assembly 10 can be pivoted or "clocked" in directions 391 about the centerline 51 (FIG. 2) of the main tube 17 of light pipe 16. The sliding engagement of the two surfaces 105 and 107 on the assembly 10 with the two complementary surfaces on the housing 382 maintains the accurate positioning of the centerline 51 in relation to the housing, even during this clocking movement. When the rectangular beam from the outlet port 19 has been accurately aligned in this manner with the rectangular array of micro-mirrors, the three screws 386-387 can be tightened in order to fixedly secure the assembly 10 in that particular angular position with respect to the projector 381.

Due in part to the multi-folded light path provided by the light pipe 16, the LED light source assembly 10 is a very compact assembly that will readily fit in a limited space. In addition, a number of parts have a generally circular shape that helps to reduce the thickness and amount of material in the assembly 10, thereby minimizing weight without compromising strength.

Figure 10:
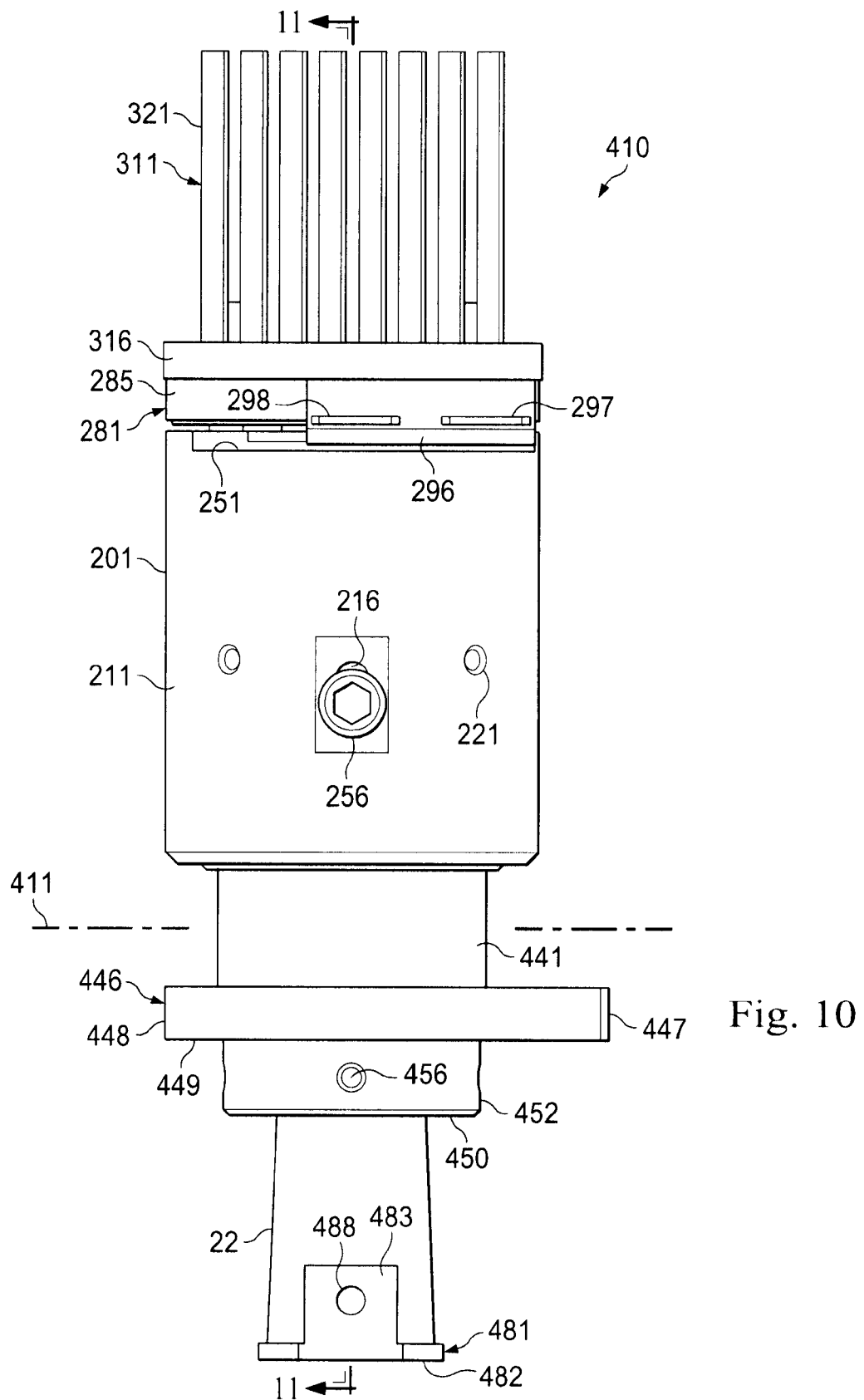
FIG. 10 is a diagrammatic side view of a monochromatic LED light source assembly that is an alternative embodiment of the polychromatic LED light source assembly of FIG. 1.
Figure 11:
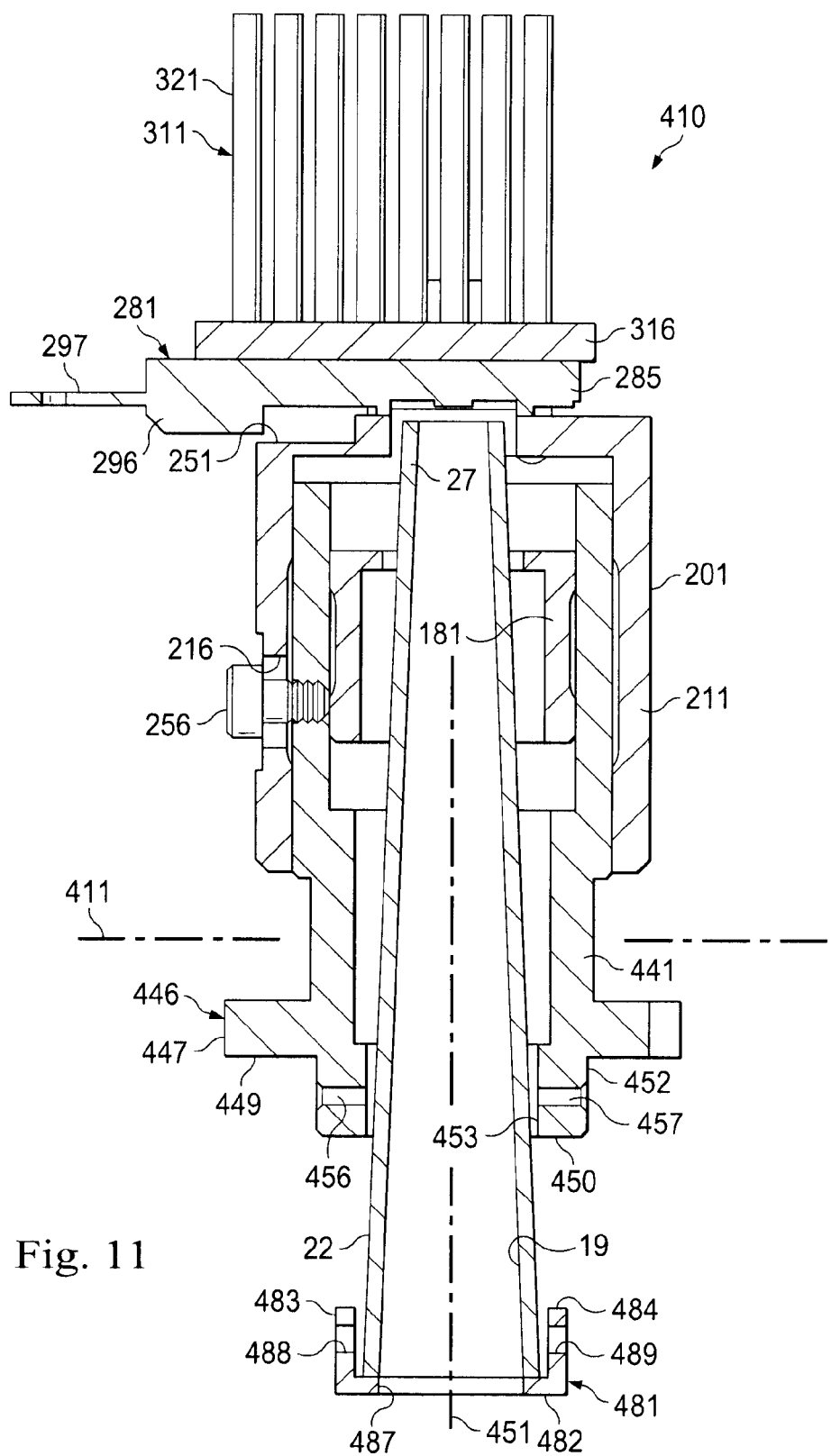
FIG. 11 is a diagrammatic sectional side view taken along the line 11-11 in FIG. 10.
Figure 12:
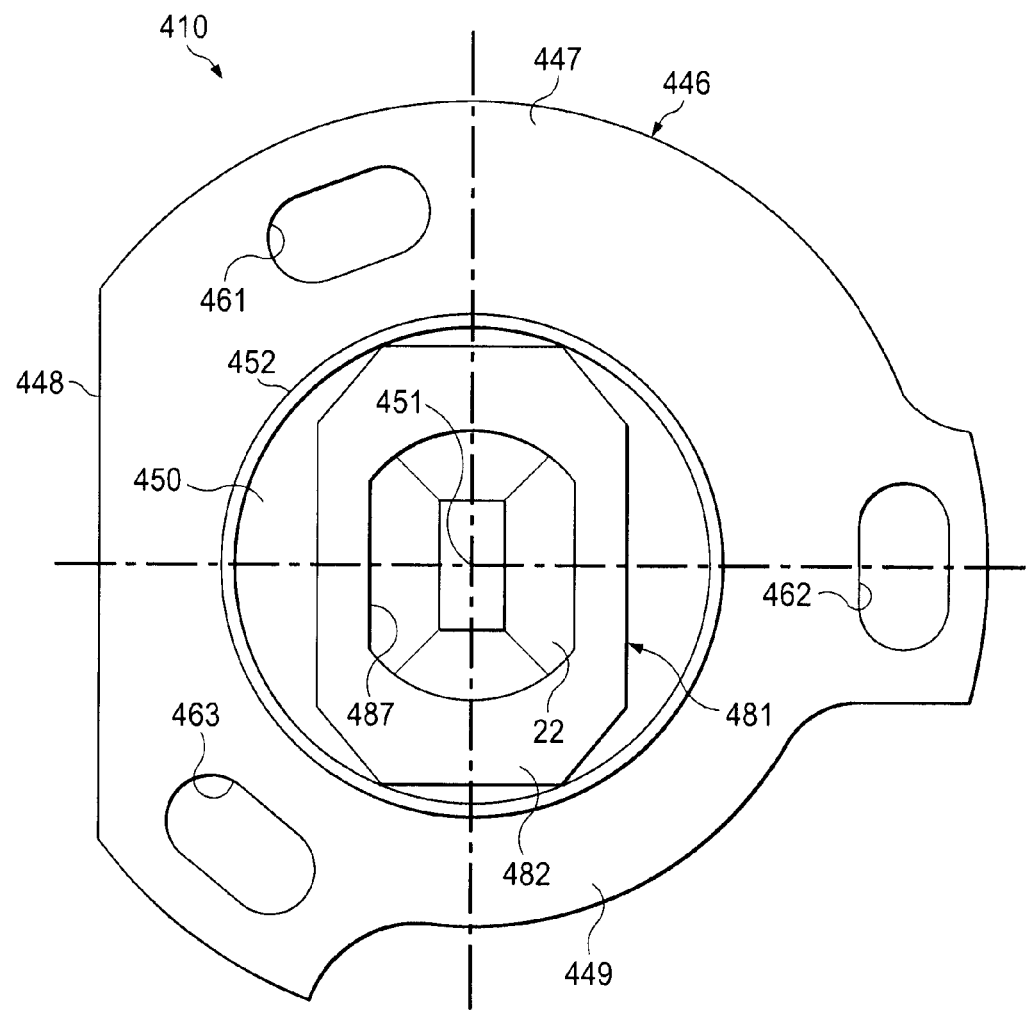
FIG. 12 is a diagrammatic bottom view of the apparatus of FIG. 10.

FIG. 10 is a diagrammatic side view of a monochromatic LED light source assembly 410 that is an alternative embodiment of the polychromatic LED light source assembly 10 of FIG. 1. FIG. 11 is a diagrammatic sectional side view taken along the line 11-11 in FIG. 10. FIG. 12 is a diagrammatic bottom view of the apparatus 410 of FIG. 10. In the disclosed embodiment, the assembly 410 outputs only green light, but it could alternatively output only some other waveband, such as blue light, red light, white light, or some other selected portion of the spectrum.

With reference to FIGS. 10 and 11, the portion of the assembly 410 disposed above an imaginary horizontal plane 411 is generally equivalent in structure and function to the portion of the assembly 10 (FIG. 1) disposed above the tabs 146 and 147 of the collector tube 141. Accordingly, the discussion that follows will focus primarily on the structure below the plane 411. In more detail, with reference to FIGS. 10 and 11, the assembly 410 includes a light pipe 22 that is effectively identical to the chimney 22 of the light pipe 16 (FIG. 2). The light pipe or chimney 22 has a rectangular inlet port 27 at an upper end thereof, and a rectangular outlet port 19 at a lower end thereof.

The assembly 410 includes a collector tube 441. As mentioned above, the portion of collector tube 441 disposed above the imaginary plane 411 is similar to the upper portion of the collector tube 141 in the embodiment of FIGS. 1-9. Below the imaginary plane 411, at the lower end of the collector tube 441, there is a mounting portion 446 that is an integral part of the collector tube. The mounting portion 446 is similar to the mounting part 101 in the embodiment of FIGS. 1-9. With reference to FIGS. 10-12, the mounting portion 446 includes a circular plate or disk 447 that has a flat 448 on one side thereof. The disk 447 can also be considered to be an annular flange. The mounting portion 447 has an annular, planar surface 449 that faces axially downwardly in FIGS. 10 and 11. The mounting portion 446 includes a cylindrical projection 450 that extends downwardly beyond the surface 449 from the lower side of the disk 447. The projection 450 has a radially-outwardly facing annular cylindrical surface 452 thereon, which is substantially concentric to a centerline 451 (FIG. 11) of the light pipe 22.

A rectangular opening 453 extends axially through the disk 447 and the projection 450. The light pipe 22 extends through the rectangular opening 453, but the opening 453 has a size larger than the associated portion of the light pipe 22, so that the edges of the opening do not contact the light pipe. Four angularly-spaced openings, only two of which are visible in the drawings at 456 and 457, extend radially through the projection 450 from the cylindrical surface 452 to the rectangular opening 453. During assembly, a not-illustrated assembly jig is used to accurately position the lower portion of the light pipe 22 within the rectangular opening 453, and to position the upper portion of the light pipe within the rectangular opening in the support part 181. During this positioning, the light pipe 22 is moved in two orthogonal directions (parallel to an X axis and Y axis) with respect to the collector tube 441, until the centerline 451 of the light pipe 22 is very accurately positioned at a particular location in relation to the collector tube 441. After the light pipe 22 has been properly positioned in this manner, an adhesive is injected through the four openings 456-457 and into the gap between the light pipe 22 and surfaces of the opening 453, and then is allowed to harden, in order to secure this portion of the light pipe against movement relative to the mounting portion 446. In addition, the adhesive is used to secure the upper portion of the light pipe 22 in relation to the support part 181, as described earlier. In the disclosed embodiment, the adhesive is the above-mentioned ECCOBOND® epoxy adhesive, but could alternatively be any other suitable adhesive. With reference to FIG. 12, the disk 447 has three arcuate slots that open axially therethrough, that extend circumferentially with respect to the centerline 451, and that are uniformly angularly spaced about the centerline 451.

At the lower end of the apparatus 410, there is a mask part 481 that is a bent metal plate. In the disclosed embodiment, the mask part 481 is made of commercially-available aluminum alloy 6061-T6, but could alternatively be made of any other suitable material. The mask part 481 includes a horizontally-extending central portion 482, and two parallel legs 483 and 484 that each extend upwardly from a respective side of the central portion 482, and that are disposed on opposite sides of the lower end of the light pipe 22. An opening 483 extends vertically through the central portion 482, and is aligned with the outlet port 19 at the lower end of the light pipe 22. The opening 487 has an approximately rectangular shape, except that the ends are slightly rounded. Alternatively, however, the opening could have some other shape.

Two openings 488 and 489 respectively extend horizontally through the legs 483 and 484. During assembly, a not-illustrated assembly jig is used to accurately position the mask part 481 with respect to the lower end of the light pipe 22. An adhesive is injected through the openings 488-489 and into the gap between each of the legs 483 and 484 and the lower end of light pipe 22, and then is allowed to harden, in order to fixedly secure the mask part 481 against movement with respect to the light pipe. In the disclosed embodiment, the adhesive is the above-mentioned ECCOBOND® epoxy adhesive, but it could alternatively be any other suitable adhesive.

In use, the monochromatic LED light source assembly 410 of FIG. 11 can be bolted to the projector 381 of FIG. 9 in place of the polychromatic LED light source assembly 10, and can be clocked in the directions 391 in the same manner already described above for assembly 10. It will be recognized that the assembly 410 provides many of the same benefits already described above in association with the assembly 10.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising a radiation source assembly that is a modular unit and includes:
   a radiation source that generates radiation, and emits the radiation approximately in a first direction;
   a radiation guide having an input port and an output port, said radiation guide supplying radiation from said input port to said output port; and
   support structure supporting said radiation source near said input port of said radiation guide in a manner so that radiation emitted by said radiation source in approximately said first direction travels to and enters said input port, and so that said radiation source is positionally adjustable toward and away from said input port respectively in said first direction and in a second direction opposite said first direction;

wherein said radiation source that emits radiation in said first direction is a first radiation source, and said input port that receives radiation from said first radiation source is a first input port;

wherein said radiation guide has a second input port, and supplies to said output port a mixture of radiation from said first and second input ports;

wherein said assembly includes a second radiation source that generates radiation, and emits the radiation approximately in a third direction; and wherein said support structure adjustably supports said second radiation source near said second input port in a manner so that radiation emitted by said second radiation source in approximately said third direction travels to and enters said second input port, and so that said second radiation source is positionally adjustable toward and away from said second input port in said third direction and in a fourth direction opposite said third direction.

2. An apparatus according to claim 1, wherein said radiation source includes a light emitting diode section that generates the radiation emitted by said radiation source.

3. An apparatus according to claim 1, wherein said support structure includes:
  a first section that has said radiation guide supported thereon;
  a second section that has said radiation source supported thereon, and that is adjustable with respect to said first section approximately parallel to said first direction; and
  structure that releasably secures said first and second sections against relative movement.

4. An apparatus according to claim 3, wherein said radiation source is removably supported on said second section, said second section and said radiation source having cooperating structure that accurately positions said radiation source with respect to said second section.

5. An apparatus according to claim 4, wherein said cooperating structure includes said second section having two spaced pins and a threaded hole, includes said radiation source having a hole therethrough, and having two spaced openings that each receive a respective one of said pins, and includes a screw that extends through said hole in said radiation source and engages said threaded hole in said second section to releasably secure said radiation source to said second section.

6. An apparatus according to claim 5, including a heat sink having a hole therethrough, said heat sink engaging said radiation source on a side thereof opposite from said second section, and said screw extending through said hole in said heat sink to releasably secure said heat sink to said second section.

7. An apparatus according to claim 4,
  wherein said first section has a threaded hole extending thereinto approximately perpendicular to said first direction;
  wherein said second section has a slot opening therethrough approximately perpendicular to said first direction and extending approximately parallel to said first direction; and
  wherein said structure that releasably secures includes a screw having a shank that extends through said slot and threadedly engages said threaded hole.

8. An apparatus according to claim 1, wherein said support structure further provides positional adjustment of said first radiation source with respect to said first input port parallel to each of fifth and sixth directions that are approximately perpendicular to each other and to said first direction, and provides positional adjustment of said second radiation source with respect to said second input port parallel to each of seventh and eighth directions that are approximately perpendicular to each other and to said third direction.

9. An apparatus according to claim 8, wherein said support structure includes:
  a first section having said radiation guide supported thereon;
  a second section that is adjustable with respect to said first section parallel to said fifth and sixth directions;
  a third section that has said first radiation source supported thereon and that is adjustable with respect to said second section approximately parallel to said first direction;
  a fourth section that is adjustable with respect to said first section parallel to said seventh and eighth directions;
  a fifth section that has said second radiation source supported thereon and that is adjustable with respect to said fourth section approximately parallel to said first direction; and
  structure that releasably secures said first and second sections against relative movement, and releasably secures said second and third sections against relative movement.

10. A method comprising:
  generating radiation with a first radiation source in a radiation source assembly that is a modular unit;
  emitting the radiation from the first radiation source approximately in a first direction;
  generating radiation with a second radiation source in said radiation source assembly;
  emitting the radiation from the second radiation source approximately in a third direction;
  supporting said first radiation source near a first input port of a radiation guide in a manner so that radiation emitted by said first radiation source in approximately said first direction travels to and enters said first input port, and so that said first radiation source is positionally adjustable toward and away from said first input port respectively in said first direction and in a second direction opposite said first direction;
  supporting said second radiation source near a second input port of said radiation guide in a manner so that radiation emitted by said second radiation source in approximately said third direction travels to and enters said second input port, and so that said second radiation source is positionally adjustable toward and away from said second input port respectively in said third direction and in a fourth direction opposite said third direction; and
  supplying radiation through said radiation guide from each of said first and second input ports thereof to an output port thereof.

11. A method according to claim 10, wherein said supporting is carried out in a manner providing positional adjustment of said first radiation source with respect to said first input port parallel to each of fifth and sixth directions that are approximately perpendicular to each other and to said first direction, and providing positional adjustment of said second radiation source with respect to said second input port parallel to each of seventh and eighth directions that are approximately perpendicular to each other and to said third direction.

12. An apparatus comprising a radiation source assembly that is a modular unit and includes:
- a radiation source that generates radiation, and emits the radiation approximately in a first direction;
- a radiation guide having an input port and an output port, said radiation guide supplying radiation from said input port to said output port; and
- support structure supporting said radiation source near said input port of said radiation guide in a manner so that radiation emitted by said radiation source in approximately said first direction travels to and enters said input port, and so that said radiation source is positionally adjustable toward and away from said input port respectively in said first direction and in a second direction opposite said first direction, said support structure further providing positional adjustment of said radiation source with respect to said input port in third and fourth directions that are approximately perpendicular to each other and to said first direction, said support structure including:
  - a first section that has said radiation guide supported thereon;
  - a second section that is adjustable with respect to said first section parallel to said third and fourth directions;
  - a third section that has said radiation source supported thereon and is adjustable with respect to said second section approximately parallel to said first direction; and
  - a structure that releasably secures said first and second sections against relative movement, and releasably secures said second and third sections against relative movement.

13. An apparatus according to claim 12,
wherein said first section has a threaded first hole extending thereinto approximately parallel to said first direction;
wherein said second section has a second hole extending therethrough approximately parallel to said first direction and has a threaded third hole extending thereinto approximately perpendicular to said first direction;
wherein said third section has a slot opening therethrough approximately perpendicular to said first direction and extending approximately parallel to said first direction; and
wherein said structure that releasably secures includes a first screw having a shank that extends through said slot and threadedly engages said third hole, and a second screw having a shank that extends through said second hole and threadedly engages said first hole, said shank of said second screw having a cross-sectional size smaller than that of said second hole.

14. An apparatus according to claim 12, wherein said radiation source includes a light emitting diode section that generates the radiation emitted by said radiation source.

* * * * *